US012514381B2

(12) United States Patent
Castro-Griffiths et al.

(10) Patent No.: US 12,514,381 B2
(45) Date of Patent: Jan. 6, 2026

(54) METHOD AND APPARATUS FOR MONITORING THE CONDITION OF A SOOTHING SEAT FOR AN INFANT

(71) Applicant: Willow Blossom Holdco Limited, London (GB)

(72) Inventors: James Castro-Griffiths, London (GB); David Connell, London (GB)

(73) Assignee: Willow Blossom Holdco Limited, London (GB)

( * ) Notice: Subject to any disclaimer, the term of this patent is extended or adjusted under 35 U.S.C. 154(b) by 0 days.

(21) Appl. No.: 18/446,181

(22) Filed: Aug. 8, 2023

(65) Prior Publication Data

US 2024/0041224 A1 Feb. 8, 2024

(30) Foreign Application Priority Data

Aug. 8, 2022 (GB) ..................... 2211541

(51) Int. Cl.
*A47D 9/02* (2006.01)
*A61B 5/00* (2006.01)
*A61B 5/11* (2006.01)

(52) U.S. Cl.
CPC ............. *A47D 9/02* (2013.01); *A61B 5/0077* (2013.01); *A61B 5/1116* (2013.01); *A61B 5/7405* (2013.01); *A61B 5/742* (2013.01)

(58) Field of Classification Search
CPC ........ A47D 9/02; A47D 13/02; A47D 13/025; A47D 13/10; A47D 15/00; A61B 5/0077; A61B 5/1116; A61B 5/7405; A61B 5/742
See application file for complete search history.

(56) References Cited

U.S. PATENT DOCUMENTS

| 2,587,121 | A | 2/1952 | Deardorff et al. |
| 3,054,591 | A | 9/1962 | Cohn |
| 3,331,632 | A | 7/1967 | Robert |
| 3,359,035 | A | 12/1967 | Bernard |
| 4,139,131 | A | 2/1979 | Hathaway |
| 4,141,095 | A | 2/1979 | Adachi |

(Continued)

FOREIGN PATENT DOCUMENTS

| CA | 3173448 A1 | 9/2021 |
| CN | 204368233 U | 6/2015 |

(Continued)

OTHER PUBLICATIONS

Combined Search and Examination Report in GB2211541.4, dated Feb. 3, 2023, 5 pages.

(Continued)

*Primary Examiner* — Tse W Chen
*Assistant Examiner* — Evelyn Grace Park

(57) ABSTRACT

A method of monitoring the condition of a soothing seat for an infant is provided. The method can include receiving an input from an electronic sensor of the soothing seat, the input indicative of a condition of the soothing seat, receiving one or more pre-determined parameters indicative of the condition of the soothing seat being in an actionable state, determining based on the input from the electronic sensor and the one or more pre-determined parameters that the condition of the soothing seat is in the actionable state, and controlling an output to implement a remedial action.

25 Claims, 7 Drawing Sheets

(56) References Cited

U.S. PATENT DOCUMENTS

| | | | |
|---|---|---|---|
| 4,181,356 A | 1/1980 | Fleischer | |
| 4,205,406 A | 6/1980 | Wangkeo et al. | |
| 4,344,649 A | 8/1982 | Fleischer | |
| 5,342,113 A | 8/1994 | Wu | |
| 6,257,070 B1 | 7/2001 | Giallorenzo et al. | |
| 6,869,368 B1 | 3/2005 | Clarke et al. | |
| 7,347,089 B1 | 3/2008 | Kelley et al. | |
| 8,316,490 B1 | 11/2012 | Bilak et al. | |
| 8,708,832 B2 | 4/2014 | Gilbert et al. | |
| 8,784,227 B2 | 7/2014 | Speedie | |
| 9,629,476 B1 | 4/2017 | Robbins et al. | |
| 10,106,187 B1 | 10/2018 | Farrar et al. | |
| 2002/0002741 A1 | 1/2002 | Tomas et al. | |
| 2002/0113469 A1 | 8/2002 | Stern et al. | |
| 2003/0069079 A1 | 4/2003 | Kelly et al. | |
| 2007/0205646 A1 | 9/2007 | Bapst et al. | |
| 2007/0262627 A1 | 11/2007 | Clapper et al. | |
| 2008/0255503 A1 | 10/2008 | Quackenbush et al. | |
| 2008/0271243 A1 | 11/2008 | Burkholder et al. | |
| 2009/0062622 A1 | 3/2009 | Lin | |
| 2009/0284050 A1 | 11/2009 | Myers | |
| 2009/0284058 A1 | 11/2009 | Gillett | |
| 2010/0062917 A1 | 3/2010 | Nanna et al. | |
| 2010/0201171 A1* | 8/2010 | Velderman | A47D 9/057 297/260.2 |
| 2012/0181830 A1 | 7/2012 | Gooris | |
| 2013/0026805 A1 | 1/2013 | Sclare et al. | |
| 2013/0214567 A1 | 8/2013 | Miller | |
| 2014/0068859 A1 | 3/2014 | Alegria | |
| 2015/0082539 A1 | 3/2015 | Lin et al. | |
| 2015/0289678 A1 | 10/2015 | Vinje Brustad et al. | |
| 2015/0342368 A1 | 12/2015 | Corso et al. | |
| 2016/0174728 A1* | 6/2016 | Karp | A61M 21/02 5/655 |
| 2016/0183695 A1 | 6/2016 | Veron | |
| 2016/0296035 A1* | 10/2016 | Gilbert | H01F 7/064 |
| 2016/0304004 A1 | 10/2016 | Sandbothe et al. | |
| 2016/0345751 A1 | 12/2016 | Mountz et al. | |
| 2017/0340285 A1 | 11/2017 | Rubin et al. | |
| 2018/0325280 A1 | 11/2018 | Paperno et al. | |
| 2019/0059611 A1 | 2/2019 | Burns et al. | |
| 2019/0247611 A1 | 8/2019 | Karp et al. | |
| 2019/0335916 A1 | 11/2019 | Taylor et al. | |
| 2019/0374044 A1 | 12/2019 | Acevedo et al. | |
| 2021/0077673 A1 | 3/2021 | Mason et al. | |
| 2023/0117090 A1 | 4/2023 | Mountz et al. | |
| 2023/0263316 A1 | 8/2023 | Herrin et al. | |
| 2023/0338630 A1 | 10/2023 | Claassen et al. | |
| 2023/0404290 A1 | 12/2023 | Nottage | |

FOREIGN PATENT DOCUMENTS

| | | |
|---|---|---|
| CN | 113080655 A | 7/2021 |
| CN | 216135540 U | 3/2022 |
| DE | 102014200790 A1 | 8/2014 |
| EP | 3549843 A1 | 10/2019 |
| EP | 4000661 A1 | 5/2022 |
| GB | 2163045 A | 2/1986 |
| GB | 2511915 A | 9/2014 |
| WO | WO-2015118652 A1 | 8/2015 |

OTHER PUBLICATIONS

Combined Search and Examination Report in GB2211542.2, mailed on Jan. 25, 2023, 7 pages.
International Search Report and Written Opinion for Application No. PCT/EP2023/071935, mailed on Oct. 26, 2023, 8 pages.
International Search Report and Written Opinion for Application No. PCT/EP2023/071966, mailed on Oct. 26, 2023, 9 pages.
International Search Report and Written Opinion for Application No. PCT/EP2024/053348, mailed on Jul. 15, 2024, 15 pages.

* cited by examiner

METHOD AND APPARATUS FOR MONITORING THE CONDITION OF A SOOTHING SEAT FOR AN INFANT

CROSS-REFERENCE TO RELATED APPLICATIONS

The present application claims priority to GB Application No. 2211541.4, filed Aug. 8, 2022, the entirety of which is incorporated herein by reference.

TECHNICAL FIELD

The present disclosure relates to a computer-implemented method and apparatus for monitoring the condition of a soothing seat and, in particular, to a soothing infant seat which may be convertible into a sleep-safe form and/or which may automatically soothe the infant or alert a parent.

SUMMARY

In a first aspect of the disclosure there is provided a computer-implemented method of monitoring the condition of a soothing seat for an infant comprising, receiving, at a processor, an input from an electronic sensor of the soothing seat, the input indicative of a condition of the soothing seat, receiving at the processor, one or more pre-determined parameters indicative of the condition of the soothing seat being in an actionable state, determining based on the input from the electronic sensor and one or more pre-determined parameters that the condition of the soothing seat is in the actionable state, and controlling an output to implement a remedial action. By monitoring the condition of the soothing seat, determining an actionable state and implementing a remedial action, the soothing seat may provide a user with accurate information about the state of the soothing seat but also automatically implement a remedy. For example, where the remedial action is playing a soothing sound or by imparting bouncing or soothing motions to the soothing seat, the infant in the seat may be automatically soothed either to sleep or to comfort them.

In a further aspect, the electronic sensor may comprise a microphone and the input indicative of the condition of the soothing seat is an audio signal corresponding to the sound at the soothing seat. By monitoring the sound, the method may provide the benefit of responding to noises such as fussing or crying, or even the sound of external noises like glass breaking, door bells, or dog barking, in order to automatically implement a remedial action to soothe an infant.

In a further aspect, the one or more pre-determined parameters indicative of the condition of the soothing seat being in an actionable state may comprise a threshold volume at a frequency corresponding to a crying baby.

In a further aspect, the one or more pre-determined parameters indicative of the condition of the soothing seat being in an actionable state may comprise a threshold volume at any audible frequency.

In a further aspect, the one or more pre-determined parameters indicative of the condition of the soothing seat being in an actionable state may comprise a threshold output from an audio pattern matching algorithm.

In a further aspect, the audio pattern matching algorithm may be configured to provide an output of a degree of match for a repetitious, descending amplitude audio signal.

In a further aspect, the electronic sensor may comprise a camera. In a further aspect, the camera may be positioned to provide a view of a seat surface of the soothing seat.

In a further aspect, the one or more pre-determined parameters indicative of the condition of the soothing seat being in an actionable state may comprise a threshold level of motion within a field of view of the camera. In a further aspect, the one or more pre-determined parameters indicative of the condition of the soothing seat being in an actionable state may comprise a threshold output from a motion tracking algorithm. In a further aspect, the electronic sensor may comprise a weight sensor configured to determine a threshold weight applied to the soothing seat.

In a further aspect, the electronic sensor may comprise an accelerometer configured to measure a degree of movement of an infant in the soothing seat in use.

In a further aspect, determining that the condition of the soothing seat is in the actionable state may comprise determining that the infant is any one of in a sitting position and not moving, in a sitting position and moving, in a sitting position and bouncing, in a lying position and moving, or in a lying position and still.

In a further aspect, controlling an output to implement a remedial action may comprise controlling a speaker to produce an audio signal. In a further aspect, the audio signal may comprise one or more of white noise, music, pre-recorded sounds. In a further aspect, the audio signal may comprise a user-recorded audio recording. In a further aspect, the method further may comprise displaying a prompt for a user to record the user-recorded audio recording, and recording the user from the microphone.

In a further aspect, controlling an output to implement a remedial action may comprise driving an electromechanical drive to apply oscillating motions to the soothing seat. In a further aspect, the electromechanical drive comprises one or more of an electric motor, a drive screw, a pneumatic actuator, or a hydraulic actuator. In a further aspect, driving the electromechanical drive to apply oscillating motions to the soothing seat may comprise applying one or more of a bouncing motion, a rocking motion, and a swinging motion.

In a further aspect, the method may further comprise monitoring the input of the electronic sensor, determining based on the input from the electronic sensor and the one or more predetermined parameters that the condition of the soothing seat is no longer in the actionable state, and controlling the output to stop implementing the remedial action. In a further aspect, controlling the output to stop implementing the remedial action may comprise gradually reducing the volume of the audio signal for a predetermined period of time. In a further aspect, controlling the output to stop implementing the remedial action may comprise gradually reducing the amplitude of the oscillating motions applied to the soothing seat.

In a further aspect, the electronic sensor may comprise a switch and/or a position sensor configured to determine the orientation of the soothing seat. In a further aspect, the electronic sensor may comprise a switch and/or a position sensor configured to determine the position of one or more components of the soothing seat. By determining the position or orientation of the soothing seat, it can be determined that the soothing seat should be reoriented to a sleep-safe configuration. For example, if an infant has fallen asleep but the soothing seat is not in the sleep-safe configuration, a user may be notified to make the soothing seat sleep-safe or the seat may be automatically reoriented to the sleep safe position.

In a further aspect, the one or more components may comprise a harness, wherein the harness is configured to cover a portion of the seat in a covering position and to retract to a retracted position wherein the retractable harness does not cover the portion of the seat.

In a further aspect, the one or more components may comprise a seat rotatably mounted to a support frame, and wherein the seat is rotatable between a first position and a second position.

In a further aspect, controlling an output to implement a remedial action may comprise causing a notification to be displayed on a user device, wherein the user device is in communication with the processor. In a further aspect, the user device may be one or more of a smartphone, a tablet, a smartwatch, and a personal computer.

In a further aspect, the user device may be in wireless communication with the processor via WiFi, cellular data, or Bluetooth.

In a further aspect, controlling an output to implement a remedial action may comprise preventing the change of position of the one or more components of the soothing seat. In a further aspect, preventing the change of position may comprise locking the one or more components of the soothing seat in position. By providing this prevention or the locking of the components of the soothing seat in position, the user or parent can be assisted in how to use the soothing seat. For example, the seat may automatically prevent a user from activating bouncing motions when the infant is asleep. Alternatively, the method may prevent a user or parent from activating bouncing motions if the harness is not deployed or is not secured.

In a further aspect, the processor may be a processor of a server or a user device physically separate from and in wired or wireless communication with the soothing seat.

In an aspect of the disclosure there is provided a soothing seat comprising a seat, a computer readable medium, one or more processors, one or more electronic sensors, and wherein the one or more processors may be configured to perform the method of any of the aspects disclosed herein.

BACKGROUND

A soothing infant seat, such as a bouncer, is a seat which may be reclined and is suitable to securely support an infant and provide a soothing, rocking or bouncing motion. Typically, a bouncer may be set in motion by manually rocking the seat while the structure of the bouncer is configured to allow the rocking, or bouncing motion to continue for a short time without further manual input. Some bouncers may be electrically driven by way of an electric drive mechanism without the requirement for manual input.

A bassinet is a bed typically used for babies from 0 to 6 months (although it could feasibly be used for older babies) and will include a flat surface for the baby to sleep on and should be free of obstructions or loose blankets or pillows which could represent a risk to the baby. Sudden Infant Death Syndrome (SIDS) is a little understood cause of infant death which usually occurs during sleep. Whilst the exact cause of SIDS is unknown, it is highly recommended that for sleep, a baby is laid to rest on their back on a horizontal flat firm mattress, free from obstruction and loose bedding and with side walls which are breathable. Where a bassinet or cot meets these, and other, requirements the bassinet or cot may be described as sleep-safe. For safety, a parent should not leave an infant alone to sleep in a non-sleep-safe environment for any extended period of time.

Problems may arise to a parent trying to monitor a bouncer and/or a bassinet to ensure that constant attention is given to maintain the wellbeing of a baby or to ensure that sleep is not disturbed. This may be particularly difficult when the parent is required to divide attention to other caring duties such as washing, cleaning, feeding themselves as well as other dependents. The present disclosure provides for a method and apparatus for monitoring the condition of a soothing seat which may allow safe sleep or comforting of a baby whilst reducing the mental burden on a parent caring for the baby.

BRIEF DESCRIPTION OF THE DRAWINGS

Specific embodiments are described below by way of example and with reference to the accompanying drawings in which.

DETAILED DESCRIPTION

Figure 1:
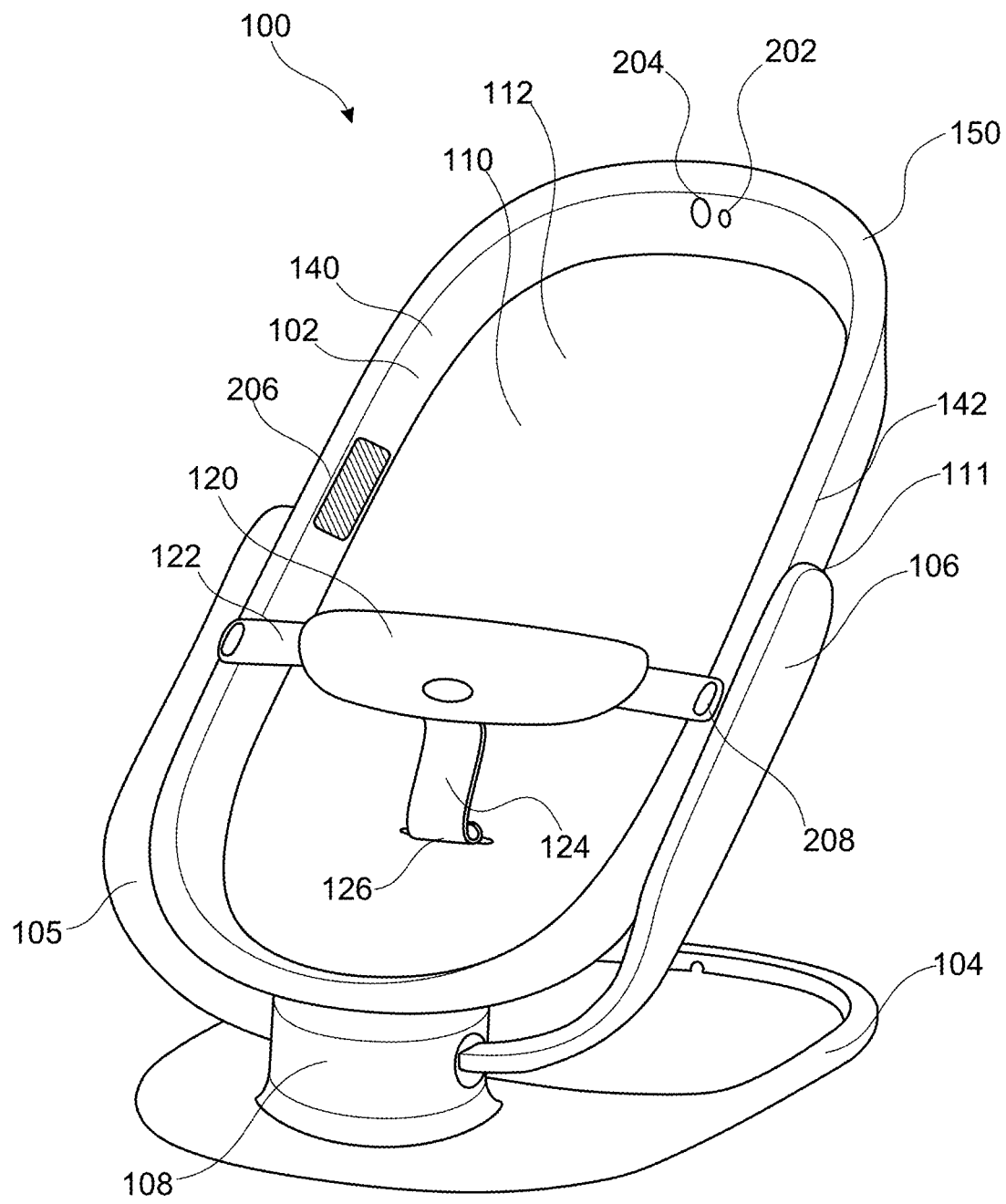
FIG. 1 shows a soothing seat in a bouncing configuration wherein the seat is inclined, according to an embodiment of the invention.

With reference to FIG. 1, there is shown a soothing seat 100 according to an embodiment of the invention. The soothing seat 100 includes a seat 102 (or receptacle) and a support frame 106. The seat 102 is pivotably connected to the support frame 106. In the embodiment shown in FIG. 1, the seat 102 is pivotably connected to the support frame 106 at the midpoint of the seat 102. However, in alternative embodiments the seat 102 may be pivotably connected to the support frame 106 at parts of the seat 102 other than the midpoint. For example, the seat 102 may be connected to the support frame 106 at or near an end of the seat 102. In yet further alternative embodiments, the seat 102 may be fixedly connected to the support frame 106 such that the seat 102 does not rotate relative to the support frame 106.

When used herein, the term seat encompasses the portion of the convertible soothing seat 100 on which an infant will be laid or seated. When the soothing seat 100 is configured as shown in FIG. 1, a seat might resemble a typical chair or seat in that the support to the infant is concave. In this way, the seat 102 will provide correct support to the infant's spine but allow the infant to be sat up. The soothing seat 100 may be convertible to a sleep-safe configuration in which the seat may also be flat (as shown in the exemplary embodiment of FIG. 2). In this way the seat would resemble a bed or a mattress in such a way that a flat horizontal sleeping surface is provided. The seat may include removable or fixed cushioning, one or more fabric layers, and one or more support elements (such as a concave or flat support or frame) to provide a bowed configuration and a flat configuration.

The support frame 106 may comprise a base portion 104 which is configured to support the convertible soothing seat 100 on the floor, ground, or other flat surface. The support frame 106 may also comprise one or more arms 105 connecting the seat 102 to the base portion 104. The one or more arms 105 are pivotably, or slidably connected to the seat 102 and may be rigidly or movably connected to the base portion 104. In the situation where the arms 105 are movably connected to the base portion 104, the base portion 104 may comprise a hinge 108 or flex joint to articulate the seat 102.

The seat 102 may be configured to cradle or securely hold an infant in use. To cradle an infant, the seat 102 comprises a support surface 110 which may be concave with respect to an infant in use. The soothing seat 100 may further include a retractable harness 120. The retractable harness 120 includes a lap strap 122 which extends laterally across the seat 102 and, optionally, a crotch strap 124 extending from the centre of the lap strap 122 and connected to the seat 102 at a connection point 126. Further optionally, the retractable harness 120 may include one or two shoulder straps (not shown) configured to extend over the infant's shoulders in use and secure the infant in the convertible soothing seat 100. As shown in FIG. 1, the retractable harness 120 is configured to secure an infant in the seat 102. In this way, the soothing seat 100 may be moved or bounced, or an infant may move around or wriggle without risk of the infant being ejected from the seat 102.

Figure 2:
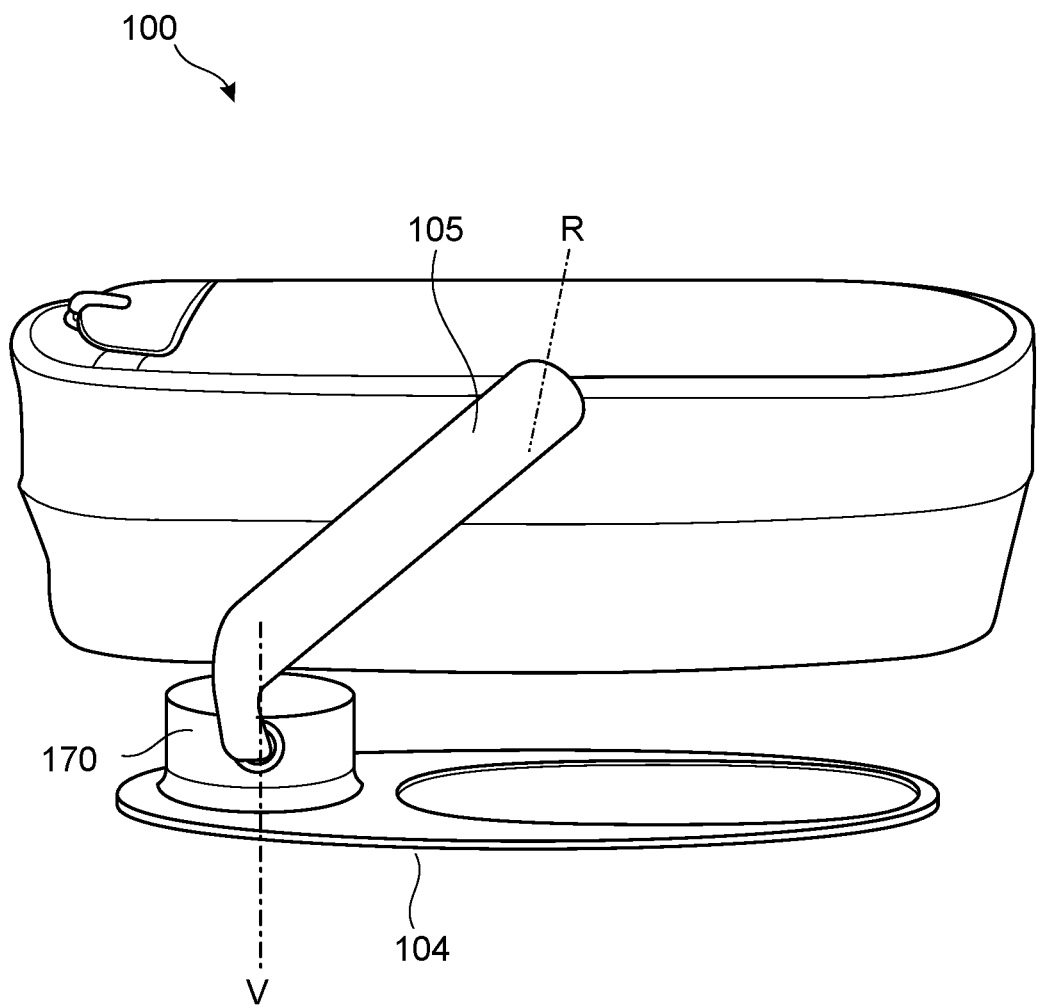
FIG. 2 shows the soothing seat of FIG. 1 in which the soothing seat has been converted into a sleep-safe configuration, according to an embodiment of the invention.
Figure 3:
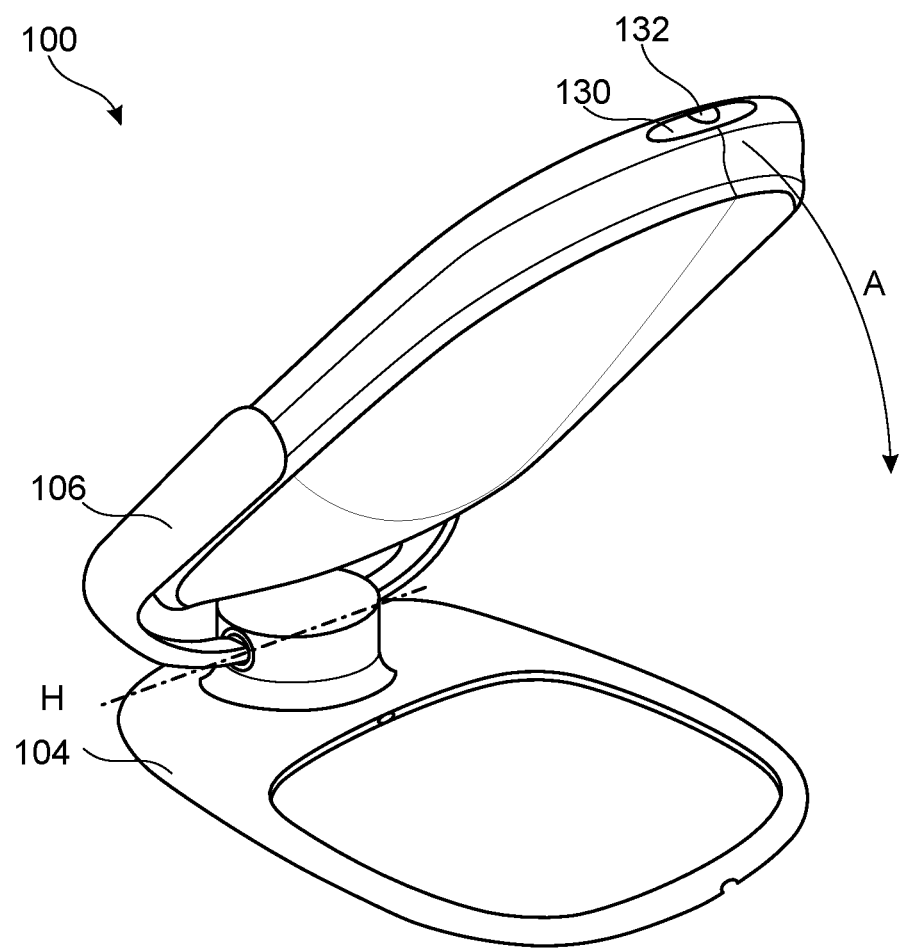
FIG. 3 shows the soothing seat of FIG. 1 being rotated from a bouncing configuration to a sleep-safe configuration, according to an embodiment of the invention.

With reference to FIG. 3, the soothing seat 100 according to an embodiment of the invention may be actuated in the direction of arrow A from the bouncing configuration shown in FIG. 1 into the sleep-safe configuration shown in FIG. 2. Once in the sleep-safe configuration of FIG. 2, the seat 102 may be actuated in a reverse direction from the sleep-safe configuration to the bouncing configuration. The seat 102 may comprise a handle 130 which a parent may use to manually pivot the seat between the bouncing configuration of FIG. 3 and the sleep-safe configuration of FIG. 4. The seat may further comprise a button 132 which is configured to lock and unlock the seat in one or both of the bouncing configuration and the sleep-safe configuration. For example, when the seat is in one of the bouncing configuration and the sleep-safe configuration a position lock (not shown) may retain the seat in that configuration. Activation of the button 132 may unlock the position lock and allow the parent to manually actuate the seat 102 from one of the bouncing configuration and the sleep-safe configuration to the other configuration. Alternatively, the button 132 may comprise an electrical switch connected to a power source, a controller, and a motor and arranged to automatically actuate the seat 102 between the bouncing and the sleep-safe configurations. Further alternatively, automatic actuation of the seat 102 between the bouncing and the sleep-safe configuration may be initiated from a user interaction with a connected device (such as a smartphone, a tablet, a smartwatch, or a personal computer), or automatically based on the input from one or more sensors.

Figure 4:
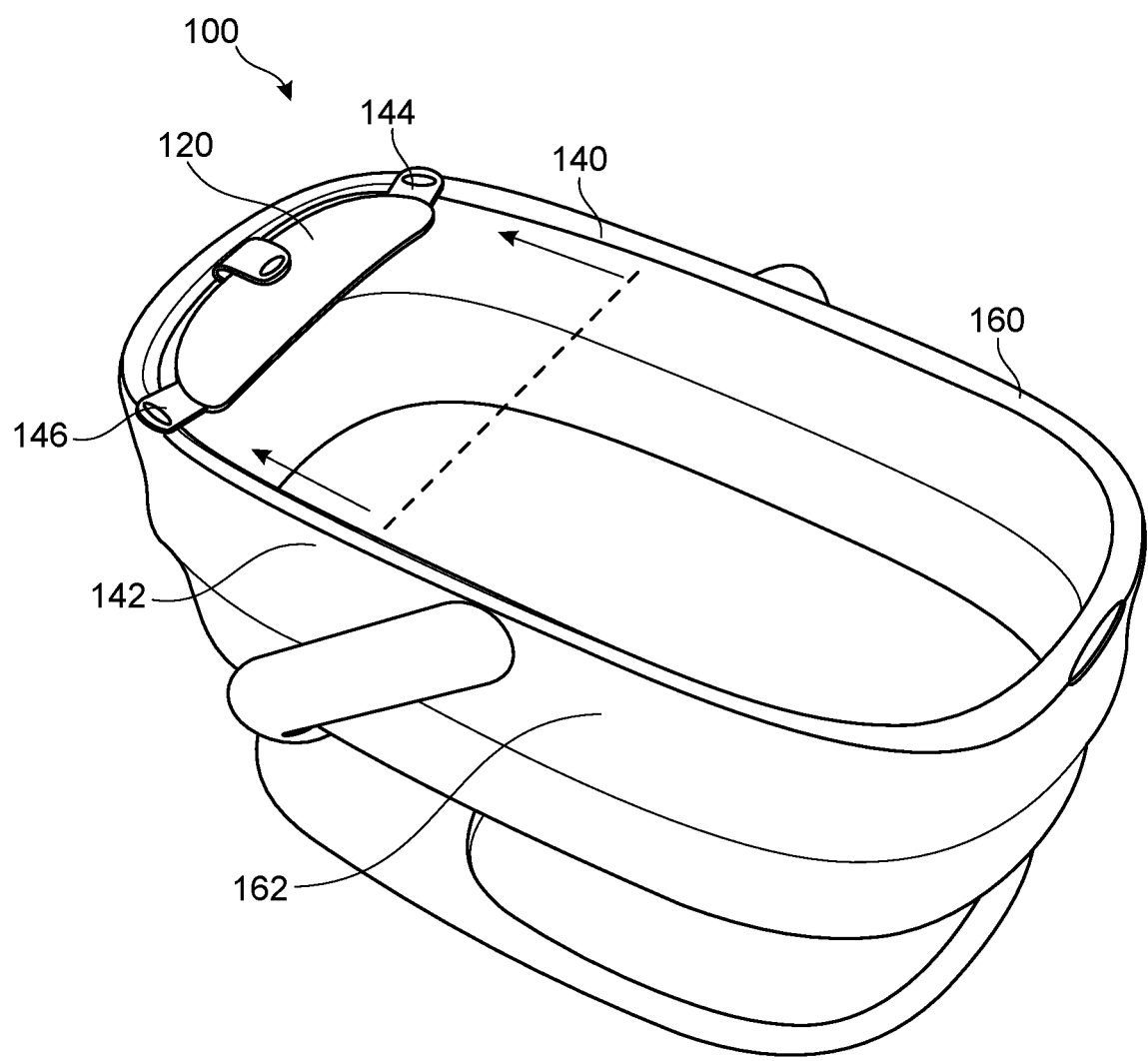
FIG. 4 shows the soothing seat of FIG. 1 in a sleep-safe configuration with the harness retracted, according to an embodiment of the invention.

With reference to FIG. 4, according to an embodiment of the invention, the retractable harness 120 may be configured to actuate between a covering position (as shown in FIG. 1) and a retracted position (shown in FIG. 4). In the covering position, the retractable harness 120 covers a portion of the seat 102. The lap strap 122 may extend laterally across the seat 102 from one side edge 140 to an opposing side edge 142. The lap strap 122 may be formed of one piece, or it may be formed of two or more pieces which join together to form the lap strap 122, for example including a left lap strap portion and a right lap strap portion. The lap strap 122 may be adjustable to accommodate infants over a range of sizes. The lap strap 122 may cover a portion of the seat 102 and provide a space between the lap strap 122 and the seat 102 for an infant to occupy. The lap strap 122 may be connected to the side edge 140 by a first connection element 144. The lap strap 122 may also be connected to the opposing side edge 142 by a second connection element 146. The first connection element 144 and the second connection element 146 may each be movably coupled to the side edge 140 and the opposing side edge 142 respectively. For example, the first connection element 144 and the second connection element 146 may be slidably received within a corresponding slot or rail disposed in each of the side edge 140 and the opposing side edge 142. In this way, the lap strap 122 and/or the harness 120 may slide from a covering position to a retracted position.

The retractable harness 120 may further comprise a crotch strap 124 extending from a midpoint of the lap strap 122. When the retractable harness 120 is in the covering position, the crotch strap 124 may be connected to the connection point 126 on the seat 102. The crotch strap 124 may be configured to retract when the retractable harness 120 is moved from the covering position to the retracted position. For example, the crotch strap 124 may be selectively connected to the connection point 126 by means of a releasable connector (seatbelt style connector, or plastic clip connector). Further, the crotch strap 124 may be configured to be stowed or retracted. For example, the crotch strap may be contained in a retractable reel, or the crotch strap may be retained in a strap or pouch on the lap strap 122. Hence, when the retractable harness 120 is moved from the covering position to the retracted position, the crotch strap 124 may be removed from obstructing the sleep-safe area of the seat 102 when the seat 102 is in the flat configuration.

The seat 102 of the convertible soothing seat 100 may further comprise a sidewall 150. The sidewall 150 extends about a circumference of the seat 102, although the sidewall 150 may only extend around a portion of the circumference of the seat 102. For example, the sidewall 150 may extend around the entire circumference of the seat 102, or it may comprise only a side edge 140 and an opposing side edge 142. As shown in FIG. 1, when the seat 102 is in the bouncing configuration, the sidewall 150 at least partially surrounds the seat 102. The sidewall 150 extends around the circumference of the seat 102 and extends above the seat 102 or away from the seat 102 such that the sidewall 150 provides a barrier to the seat 102. Alternatively, the sidewall 150 may extend around the circumference of the seat 102 but not extend away from the seat 102 such that the sidewall does not provide a barrier to the seat 102 in the bouncing configuration.

With reference to FIGS. 3 and 4, when the seat 102 is actuated from the bouncing configuration to the sleep-safe configuration, the sidewall 150 is configured to move from a lowered position (as shown in the bouncing configuration in FIG. 3) wherein the sidewall either does not extend above the seat or only extends a short distance above the seat, to a raised position (as shown in the sleep-safe configuration in FIG. 4) wherein the sidewall 150 extends above the seat 102 a greater distance than in the lowered position. In this way, the sidewall 150 may be extended to provide a suitable barrier in the sleep-safe configuration and may be retracted or lowered to provide access in the bouncing configuration.

Now with reference to FIG. 1, the soothing seat 100 may further comprise a microphone 202. The microphone 202 may be fixed to the sidewall 150, or any other part of the soothing seat 100. Alternatively to a microphone 202 being mounted to the soothing seat 100, the microphone 202 may be external to the soothing seat 100 and located within audible proximity of the soothing seat 100. An external microphone may include the microphone of a connected device such as a smartphone, tablet, smartwatch, or personal computer. The soothing seat 100 may further comprise a camera 204. The camera 204 is positioned to provide a field of view which covers the seat 102 of the soothing seat 100. In this way, the camera 204 may provide images of an infant in the soothing seat 100 in use. The camera 204 may send the images of an infant in the soothing seat to a user device, for example the phone of a parent. The camera 204 may send the images of an infant in the soothing seat to be processed according to the methods described herein.

Figure 5:
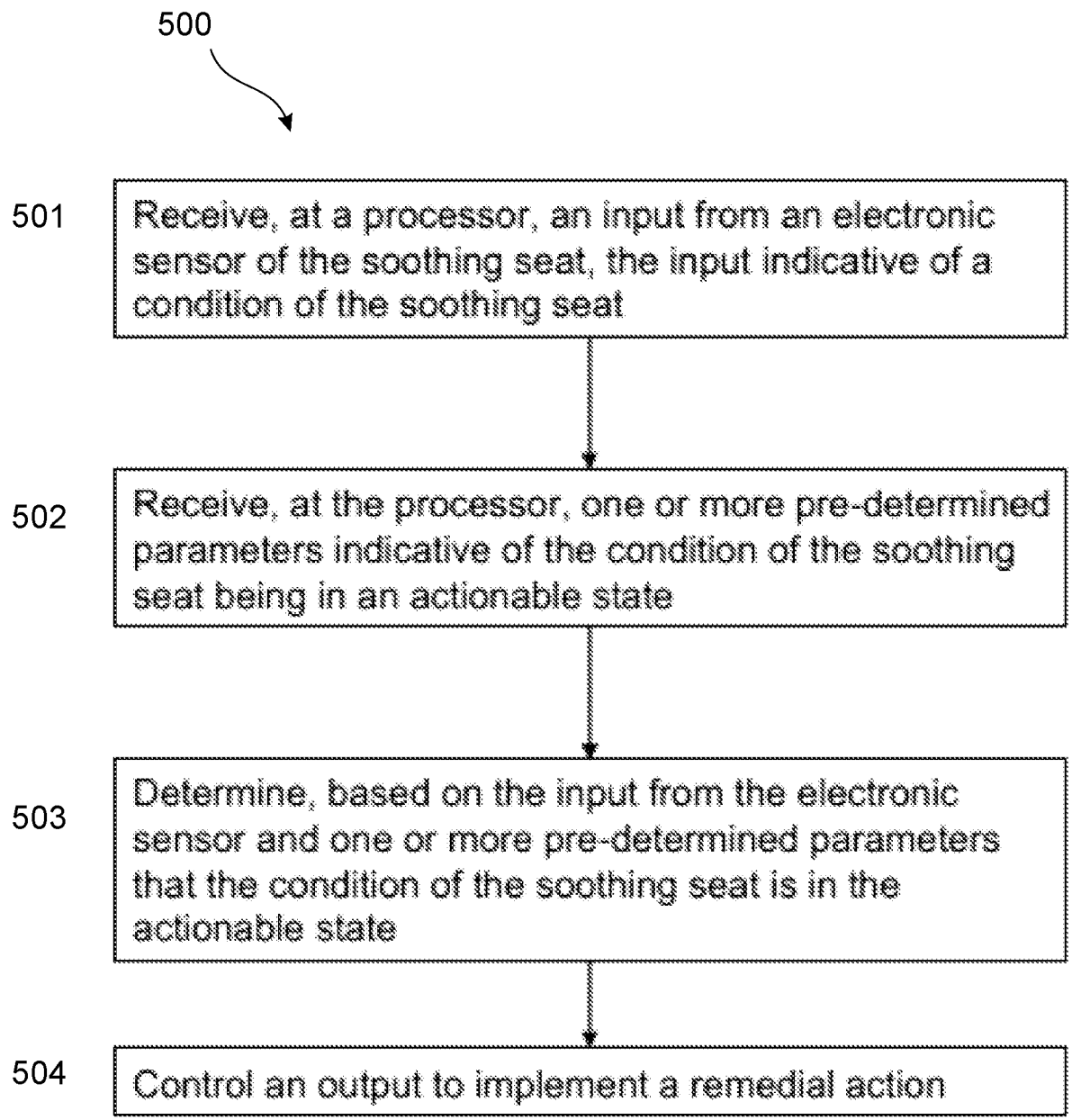
FIG. 5 shows a flowchart of a method for monitoring the condition of a soothing seat, according to an embodiment of the invention.

With reference to FIG. 5, in a first step 501 of a computer-implemented method 500 of monitoring the condition of the soothing seat 100, an input is received from an electronic sensor of the soothing seat 100 at a processor. The input is indicative of a condition of the soothing seat 100. For example, the electronic sensor may comprise the microphone 202 mounted to the soothing seat 100, or a microphone located in audible proximity of the soothing seat. Where the electronic sensor comprises a microphone 100, the input indicative of the condition of the soothing seat is an audio signal corresponding to the sound audible at the soothing seat. The microphone 202 may pick up sounds from an infant in the soothing seat 100, and/or the microphone may pick up sounds from the environment. Sounds from the environment may include noises from traffic, other children or adults in the vicinity of the soothing seat 100, television noises, animal noises such as a dog barking, or any one of many environmental sounds. Where the microphone 202 picks up sounds emanating from the infant, the sounds may provide an indication of the state of the infant. For example, the microphone 202 may pick up the sound of the infant laughing, crying, screaming, or fussing. Each of these different sounds may be used as an indication of the condition of the soothing seat. For example, the sound of the infant fussing may provide an indication that the infant is restless and may need comforting or may be about to wake up. The sound of the infant laughing may provide an indication that the infant is in enjoyment of the current motion of the soothing seat 100. Alternatively, the absence of sound emanating from the infant may provide an indication that the infant is sleeping or not present in the soothing seat 100.

Additionally or alternatively, the electronic sensor may comprise a camera 204. The camera 204 may be mounted in the sidewall 150 of the soothing seat 100, or on any other structure of the soothing seat 100 which provides the camera 204 with a field of view which covers at least a portion of the soothing seat where the infant is to be located in use. Alternatively, the camera 204 may be external to the soothing seat 100, for example the camera 204 may be a separate unit (not shown) which can be mounted or stood such that it has a field of view covering the soothing seat 100. Since the field of view of the camera 204 covers the soothing seat 100 or at least a portion of the soothing seat 100 where the infant is to be located, motion of the infant may be picked up by the camera 204. For example, motions of the infant such as arm waving, wriggling, or otherwise fussing may be detected by the camera. Alternatively, the absence of motion may indicate that the infant is resting peacefully or asleep. The camera may also be capable of detecting facial features and/or expressions indicative of the state of the infant, for example closed or open eyes, or eyes indicating distress. Alternatively or additionally, the camera 204 may provide an indication of environmental conditions, for example the camera 204 may provide an indication of whether the soothing seat 100 is in a light or a dark environment, if the lights have been switched on, or if there is a lot of movement in the background.

Additionally or alternatively, the electronic sensor may comprise a weight sensor. The weight sensor may comprise a pressure pad or load detecting device embedded in the seat or cushion of the soothing seat such that an electrical signal indicative of the presence of the weight of an infant in the soothing seat 100 may be detected by the processor. Alternatively, a load sensor or load cell may be mounted at another position in the soothing seat 100, for example on the base or on a support leg or frame of the soothing seat such that the weight of an infant in the soothing seat is detected as a load in the base, support leg, or frame. Where the electronic sensor comprises a weight sensor, the method may include determining the presence of an infant in the soothing seat 100 by detecting the presence of a threshold weight applied to the weight sensor. The method may further include determining that the weight applied to the weight sensor exceeds an upper threshold. The upper threshold may be set at a weight which is unlikely to indicate the presence of an infant in the soothing seat, but rather a weight at which the soothing seat 100 is being overloaded. This may allow the method to determine that too much weight is being applied to the soothing seat 100, which may be dangerous or may indicate abuse of the soothing seat 100. In response to detecting the presence of an infant in the soothing seat 100, the method may include allowing other functions of the soothing seat 100 to operate. For example, in response to the determination that an infant is present, remedial actions may be taken which assume the presence of an infant in the soothing seat 100, such as soothing operations, sending alerts to the parent, or further monitoring and determining the state of the soothing seat 100. If it is determined that an infant is not present in the soothing seat 100 (for example, because the threshold weight is not exceeded or the upper threshold weight is exceeded) then the method may include stopping or pausing monitoring the condition of the soothing seat 100 until the weight of an infant is detected. In this way, computationally intensive monitoring processes or the use of bandwidth and data services to monitor the condition of the soothing seat 100 may be stopped to preserve energy or reduce bandwidth use. After a threshold period of time where the threshold weight has not been reached, the method may include entering a power save mode from which a user must turn on the soothing seat 100 to continue use. The method may further include tracking a weight of an infant measured by the weight sensor in the soothing seat 100. Tracking a weight of an infant measured by the weight sensor may include recording the weight applied to the weight sensor at a first time an infant is occupying the soothing seat 100, recording the weight applied to the weight sensor at a second time an infant is occupying the soothing seat 100, wherein the first time and the second time are different times. The first time and the second time may be separated by a time period in which the soothing seat 100 is not occupied by the infant. Tracking the weight of an infant may further comprise determining a difference between the weight measured at the first time and the weight measured at the second time. The method may further comprise, in response to determining a difference between the weight measured at the first time and the weight measured at the second time, updating the threshold weight at which an infant is detected.

Additionally or alternatively, the electronic sensor may include an accelerometer configured to measure a degree of movement of an infant in the soothing seat in use. Such an accelerometer may be mounted directly to a seat or in a seat cushion of the soothing seat 100 such that movement of an infant in the soothing seat 100 will cause a corresponding signal to be received from the accelerometer. Optionally, based on the signal from the accelerometer, it may be determined either that and infant is moving or is not moving. In combination with a known orientation of the soothing seat 100 (for example from a switch or a position sensor configured to determine the orientation of the soothing seat 100) it may be determined that the infant is in a sitting position and not moving (or still), in a sitting position and moving, in a sitting position and bouncing, in a lying position and moving, or in a lying position and not moving (or still). By monitoring the condition of the soothing seat 100 in this way, it may be determined that the condition is actionable. For example, if the infant is sitting and still, the parent may need to be notified that the soothing seat 100 is not in a sleep safe orientation. Alternatively, if it is determined that the infant is in a lying position and moving, the parent may need to be notified that the infant is awake or the infant may need to be soothed. Other remedial actions may be taken, such as rocking, bouncing, or swinging the soothing seat 100, playing audio to soothe the infant, or notifying the parent. Alternatively or additionally, the method may include determining occupancy of the soothing seat in response to the signal received from the accelerometer or gyroscope. The signal received from the accelerometer or gyroscope may be a signal which indicates that the soothing seat is flexed into a position, attitude, or angle which is different from the position, attitude, or angle at which the soothing seat would rest when not occupied by an infant. The soothing seat may be configured to flex or bend in response to the weight of an infant occupying the soothing seat. In this way, when an infant occupies the soothing seat, the soothing seat may flex from a first attitude or angle to a second attitude or angle. The first attitude or angle may be indicative of the soothing seat being unoccupied and the second attitude or angle may be indicative of the soothing seat 100 being occupied. The difference between the first attitude or angle and the second attitude or angle may be proportional to the weight of an infant given the pre-determined stiffness of the soothing seat in response to flexing under weight.

Alternatively or additionally to an accelerometer, the degree of movement of an infant in the soothing seat in use may be sensed by use of one or more of a gyroscope, a linear or rotary encoder, or other position sensing transducer for example inductance or magnetic sensors configured to sense the motion of a seat of the soothing seat 100 relative to the base of the soothing seat 100 or to the ground.

Additionally or alternatively, the electronic sensor may comprise a temperature sensor. The temperature sensor may be a contact sensor located in the soothing seat 100, for example in a seat or a seat cushion of the soothing seat 100. Alternatively, the temperature sensor may be a non-contact or infrared temperature sensor positioned in view of an infant in use. The signal from the temperature sensor may provide an indication of the temperature of one or both of the infant in use or the soothing seat 100 itself. Monitoring of the condition of the soothing seat 100 may include either determining that the temperature of the infant or the soothing seat 100 is too low or that it is too high. The remedial action in response to determining that the temperature is outside of pre-determined bounds may include notifying the parent or issuing an alert to the user.

Additionally or alternatively, the electronic sensor may comprise an Electro-Cardiogram sensor (ECG) configured to determine the state of blood flow in an infant in use. The output of the ECG may be used to determine a state of the infant. For example, the ECG may determine an increased heart rate of an infant in use. The increased heart rate when the previous state of the infant has been lying and still, or sleeping, may indicate an infant who is waking or awake. An increased heart rate when the previous state of the infant has been sitting and bouncing may indicate that the infant is being excited. Alternatively, the ECG may determine a decreased heart rate of an infant in use. The decreased heart rate when the previous state of the infant has been lying and still or sleeping, may indicate an infant who is sleeping soundly or entering a deep sleep. The decreased heart rate when the previous state of the infant has been sitting and moving or bouncing may indicate that the infant has been successfully soothed.

Figure 6:
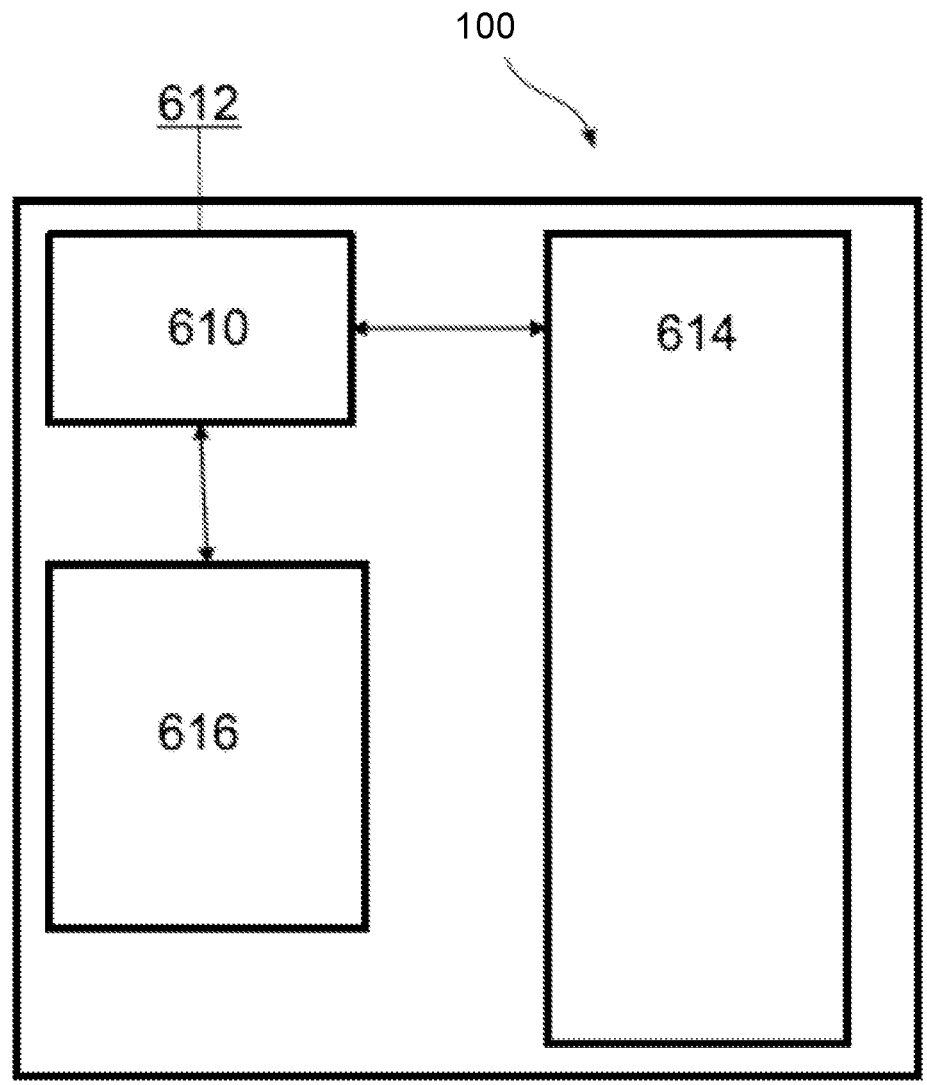
FIG. 6 shows a schematic of the soothing seat of FIG. 1 indicating the layout of processors and input/output devices, according to an embodiment of the invention.

FIG. 6 shows a schematic of the soothing infant seat 100 comprising one or more processors 610, an output device 616, and one or more electronic sensors 614. The one or more electronic sensors 614 may comprise any of the switches, position sensors, microphones, cameras, light sensors, weight sensors, accelerometers, gyroscopes, linear or rotary encoders, inductance sensors, magnetic sensors, temperature sensors, or ECG sensors described herein. The one or more electronic sensors 614 are in communication with the one or more processors 610. The one or more processors 610 may carry out one or more steps of the method described herein. Alternatively, the one or more processors 610 may be in communication to one or more external processors 612 via a wired or wireless connection. In such an instance one or more steps of the methods described herein may be carried out completely or in-part on either of the one or more processors 610 or on the one or more external processors 612. The soothing infant seat may comprise one or more output devices 616, for example but not limited to lights, LEDs, speakers, buzzers, or wired or wireless connection to one or more user devices.

In a second step 502 of the method 500 one or more pre-determined parameters indicative of the condition of the soothing seat being in an actionable state are received at the processor. If the one or more pre-determined parameters are indicative of the soothing seat not being in an actionable state, then no action need be taken. For example, should the sensor comprise a camera and there is no change in the light conditions, the condition of the soothing seat may be in a non-actionable state, wherein no further action is taken. The second step may be carried out prior to the first step, concurrently with the first step, or after the first step. For example, the method may be implemented by a user defining a pre-determined parameter in advance of using the soothing seat. The pre-determined parameter may include, for example, a threshold level of environmental noise or a threshold level of audible fussing. This may be determined by a parent based on their understanding of how much fussing or environmental noise is indicative that their infant is likely to be waking. Alternatively, the pre-determined parameter may be determined on the fly, concurrently with the first step or after the first step has occurred. For example, the pre-determined parameters may be obtained from another source such as downloaded from a server device over a network connection or from a user community of example parameters. An actionable state may include any state which would benefit from remedial action. For example, one actionable state would be that the infant in the soothing seat 100 has started audibly fussing or crying. Another actionable state would be that the infant has started visibly moving in the soothing seat 100. Another actionable state would be that the brightness of the environment in which the soothing seat is located has increased, indicating that the infant in the soothing seat 100 has been suddenly bathed in light.

In a third step 503 of the method 500, the processor determines, based on the input from the electronic sensor and the one or more pre-defined parameters, that the condition of the soothing seat is in the actionable state. Determining that the soothing seat 100 is in the actionable state may include the processor comparing the current input from the electronic sensor to previous inputs from said device or a database of inputs from other devices. For example, where the input is from a camera 204, the processor may compare the average level of light received by the camera at a point in time with the average level of light received by the camera before that point in time. In this way, the processor may determine that the level of light has changed.

Previous inputs from the soothing seat may include a history of device data including the condition of the soothing seat, raw data from one or more electronic sensors, encoded data from one or more electronic sensors, timestamps associated with the data, and/or other associated inputs for example user entered parameters. The condition of the soothing seat may be recorded over time and provide a history of the condition of the soothing seat and the time at which the condition may change. The history of the condition of the soothing seat may provide an indication of what times in use the condition of the soothing seat may be likely to change. For example, it may be that the infant who typically is seated in the present device is unlikely to sleep for more than a 20 minute session without further intervention. The raw data from one or more electronic sensors may provide further understanding of the varying conditions of the soothing seat. For example, where the electronic sensor comprises a camera, the raw data may reveal that the infant who typically is seated in the present device is likely to change condition when the level of light detected is suddenly increased, for example when lights are turned on. Where the electronic sensor comprises a microphone, the raw data may reveal that loud noises or a lack of background noise may increase the chance of the condition of the soothing seat changing because the infant is likely to wake. Where the electronic sensor comprises a temperature sensor, the raw data may reveal that the condition of the soothing seat changing corresponds with a high or a low temperature. The raw data may be encoded such that events may be captured. For example, the raw data may be encoded as one or more events such as a temperature or light change, a motion change, or a loud noise event. The encoded event may include time and duration, and/or event type information that may be associated with the condition of the soothing seat. Alternatively, or additionally, a user may enter new parameters which may be used to correlate with the condition of the soothing seat. For example, a user may enter feeding times of the infant or when the infant has been moved to a different location. These user entered parameters may be used to provide a history of the condition of the soothing seat with respect to the recorded inputs.

The history of the condition of the soothing seat may be used to predict the condition of the soothing seat given a new set of inputs from the electronic sensor. For example, where a temperature change has been shown from the history of the condition of the soothing seat to result in a change of the condition of the soothing seat, it may be determined that the infant is likely to awaken without further intervention. Preventative remedial action may then be taken. In this way, the soothing seat 100 may pre-empt and prevent condition changes where these would be undesirable.

Alternatively, or additionally, the method may benefit from a larger database of history of device data for other users of similar devices. Since there is a limited time span of the growth of an infant over which the soothing seat may be used, there is a limited history of data from which inferences can be drawn. For example, an infant may outgrow the soothing seat after a period of 6-12 months from the parent purchasing or using the soothing seat. It is therefore desirable to be able to benefit from the data collected from other users. In such a case the data may be anonymised such that no personal details can be derived or implied from the data collected. By drawing on the history data from a number of other users in a database, better predictions may be made for when remedial actions should be taken and or when the condition of the soothing seat is in an actionable state.

Alternatively or additionally, determining that the condition of the soothing seat is in the actionable state may comprise a more complex assessment of the condition of the soothing seat. For example, where the electronic sensor is a microphone 202, determining that the condition of the soothing seat 100 is in the actionable state may comprise determining whether the volume of a sound at a defined frequency is greater than a threshold level. The defined frequency may be chosen to be a frequency at which babies would typically cry (for example around 400-500 Hz). Alternatively or additionally, determining that the condition of the soothing seat 100 is in the actionable state may comprise using an audio pattern matching algorithm to detect a particular audio pattern. The algorithm may, for example, provide an output of a degree of matching to a particular audio pattern. Determining that the condition of the soothing seat 100 being in the actionable state may include determining that the degree of matching to a particular audio pattern is over a threshold degree of matching. For example, the audio matching algorithm may provide a degree of matching to a typical infant crying or fussing sound. Where the degree of matching is greater than 50% it may be determined that the infant is likely to be crying or fussing and a remedial action should be taken. A typical infant crying sound may include a particular sound pattern, for example a repetitious, descending amplitude audio signal. The processor may determine that a repetitious, descending amplitude audio signal has been received from the microphone and therefore that the soothing seat 100 is in an actionable state.

Alternatively or additionally, determining that the condition of the soothing seat 100 is in the actionable state may comprise comparing a level of motion within the field of view of the camera 204 with a threshold level of motion. Where the level of motion within the field of view of the camera 204 is greater than the threshold level of motion, the processor determines that condition of the soothing seat 100 is in an actionable state. Level of motion may correspond to physical activity in the soothing seat 100, for example an infant moving may indicate that the infant is restless or not sleeping. The level of motion may be determined by one or more visual algorithms, for example using an edge detect algorithm to determine edges within the field of view and comparing the degree of variation of those edges over a time period. Pixel matching techniques may be used to determine a level of motion within the field of view of camera 204. Alternatively or additionally, a motion tracking algorithm may be used to determine motion of an infant in the field of view of the camera 204. For example, the motion tracking algorithm may determine the position of the infant's head, body, limbs, and/or joints in each image from the camera 204. The level of motion of the infant may be determined based on the relative motions of the infant's head, body, limbs, and/or joints within the field of view.

In a fourth step 504 of the method 500, the processor controls an output to implement a remedial action. The remedial action may be producing an audio signal output from a speaker 206. The speaker 206 may be fixed to the soothing seat 100 (as shown in FIG. 1) or the speaker 206 may be external to the soothing seat 100 (not shown in figures). The audio signal output at the speaker 206 may include white noise which can provide a non-distracting background which may help cover up other more distracting noises from the environment. The audio signal output may comprise music or other pre-recorded sounds. Such music or pre-recorded sounds may include calming music or sounds from nature such as rain, waves, or birdsong.

Alternatively or additionally, the audio signal may comprise a user-recorded audio recording. In use, a parent may pre-record sounds of their own voice to be played back to the infant at moments where remedial action is required. For example, a parent may pre-record cooing or other soothing sounds in their own voice so as to provide comfort to a restless or fussing infant. The user-recorded audio recording may alternatively be live-recorded or substantially live-recorded. In such an instance, the method may include displaying a prompt for the parent to record the user-recorded audio recording to be played back to the infant. This may take the form of a notification to the parent on a user device such as a smartphone, tablet, smartwatch, or personal computer and a prompt for the user to record the user-recorded audio recording into a microphone of the user device. The user-recorded audio recording may then be transferred to the processor of the soothing seat for playback via the speaker 206.

Alternatively or additionally, the remedial action may comprise driving an electromechanical drive to apply oscillating motions to the soothing seat 100. The soothing seat 100 may comprise a motor or other electromechanical drive in the plinth 170. The plinth 170 connects the base 110 of the support frame to the seat 102 via the arms 105. The plinth 170 is rotatable about a vertical axis V relative to the base 110. The arms may further be rotatable about a horizontal axis H within the plinth 170. The electromechanical drive may be configured to apply one or both oscillating motions to the soothing seat 100 about the vertical axis V such that the seat 102 will swing back and forth and about the horizontal axis H such that the seat 102 will bounce vertically, or up and down. The seat 102 may be configured to oscillate about a second horizontal axis R at the point where the seat 102 is supported by the arms 105. A motor or other electromechanical drive may be configured to produce oscillating motions about the second horizontal axis R such that the seat is rocked about the axis R. The processor, in combination with the one or more electromechanical drives may apply a combination of bouncing motions (about axis H), rocking motions (about axis R), and swinging motions (about axis V) to provide a combined oscillating motion so as to mimic how the soothing seat 100 might be manually bounced, rocked, and or swung.

In a further step of the computer-implemented method, the input of the electronic sensor may be continually monitored to determine when the condition of the soothing seat is no longer in the actionable state. For example, where the sensor is a microphone 202 and the infant has been crying or fussing, and remedial action such as playing white noise or other sounds has successfully soothed the infant to no longer cry or fuss, the method may further include controlling the output to stop implementing the remedial action. In the case where the remedial action is the output of sounds from the speaker 206, the method may include stopping playback of the sounds from the speaker 206. Stopping the remedial action may comprise a gradual stopping of the remedial action, for example gradually reducing the volume of the audio signal over a predetermined period of time so that a sudden change in volume does not startle the infant. Where the remedial action is the application of oscillating motions to the seat 102, the oscillating motions may be gradually decreased in amplitude over a predetermined period of time until the soothing seat 100 is no longer oscillating.

In some implementations, the electronic sensor comprises a switch and/or a position sensor configured to determine the orientation of the soothing seat. In the case of a switch, the switch may be a contact switch located on the underside of the base 104 to determine if the soothing seat is in contact with the ground or other flat surface. In the case of a position sensor, the position sensor may be an accelerometer fixed to the soothing seat 100 and configured to determine if the soothing seat 100 is positioned level on a surface or if the soothing seat 100 is positioned at an angle. At an angle, it might be dangerous to automatically operate some or all of the electromechanical actuators. For example, if the soothing seat 100 is placed on a slope or angled surface, it may be inappropriate to cause oscillating motions to be applied to the seat 102. In such a case, the processor may prevent oscillating motions from being applied to one or more of the electromechanical actuators, stop oscillating motions from being applied to one or more of the electromechanical actuators if oscillating motions are already being applied, and/or cause a warning to be displayed or audibly produced from one or more of the speaker 206 or a user device such as a connected smartphone, tablet, smartwatch, or personal computer.

In some implementations the electronic sensor comprises a switch and/or a position sensor to determine the position of one or more components of the soothing seat. For example, a switch or position sensor may be included in the plinth configured to determine the orientation of the seat about the vertical axis V, or the horizontal axis H. A switch or position sensor 111 may be included in the arms 105 to detect the position of the seat 102 in rotation about the arms 105. In this way, the processor may determine whether the seat 102 is in the bouncing configuration (shown in FIG. 1) or in the sleep-safe configuration (shown in FIG. 2).

In some implementations the electronic sensor comprises a switch and/or a position sensor to determine the position of the harness. A switch or position sensor 208 may be included in a slide mechanism of the harness such that the input to the processor provides an indication of whether the harness is in the covering position or in the retracted position. If the soothing seat 100 is in the bouncing configuration but the harness is in the retracted position, the processor may prevent the one or more electromechanical actuators from applying oscillating motions to the seat 102. This may prevent oscillating motions from ejecting an infant from the seat 102 because the harness 120 is not in the correct covering position. In another example, the processor may cause a warning to be displayed (e.g. on a connected user device) or otherwise notified (e.g. audibly through speaker 206) to alert a parent that the harness 120 is in the covering position when the seat 102 has been rotated to the horizontal sleep-safe configuration. In such an instance, the harness 120 may represent a danger to a sleeping infant by obstructing the sleep-safe area.

In some implementations, controlling the output to implement a remedial action may comprise preventing the change of position of one or more components of the soothing seat. For example, the processor may cause a lock to engage in the arms 105 of the soothing seat 100 to prevent the seat 102 from being rotated from the sleep-safe configuration to the bouncing configuration until it has been detected that the harness 120 has been moved into the covering position. In this way, the method may prevent the soothing seat 100 from being configurable in a state in which the soothing seat may be bounced or swung without the presence of the harness 120 to restrain the infant.

The soothing seat 100 includes one or more processors as well as means to connect to a network of other computing devices. The network of other computing devices may be a wide area network (WAN), a local area network (LAN), or a personal area network (PAN). In the case of a WAN the connection may be effected via a proxy device via a LAN or PAN, for example via a network device, router, or bridge device, or via a home assistant device. For example, the soothing seat 100 may include a WiFi, cellular data, Zigbee, or Bluetooth connection. Such wireless connection allows for the processor of the soothing seat 100 to communicate with another user device. The user device may be any personal computing device, but is likely to be a smartphone, a tablet, a home assistant device, a smart home hub, or a smartwatch. The user device may include one or more applications configured to provide a graphical user interface such that a parent may configure and interact with the soothing seat via the connection to the network. The network may be a direct peer-to-peer connection (such as in Bluetooth or other PAN), via a local network or LAN (such as in direct connection over WiFi), or via a wide area network or WAN (connection to the internet via WiFi or cellular data). Wherein the connection is via a WAN, the soothing seat 100 may be configured to connect to one or more servers which may provide configuration data or control signals. For example, a pool of users may determine that certain predetermined settings related to oscillating motions or detection of fussing/crying work well for them. Such community defined configuration data may be downloaded to the soothing seat 100 from the server, and optionally via the user device, to provide a community defined best solution.

The method may be implemented using the processor of the soothing seat 100. Alternatively, the method may be implemented by communicating with an external processor, for example a processor of the user device or a processor of a server to which the processor of the soothing seat 100 is configured to send and receive data with. It will be appreciated by the skilled person that one or more steps of the method may be offloaded from the processor of the soothing seat 100 to one or more other processors. By offloading the processing steps to a server or to a user device, it will be appreciated that updates to the software or methods may be implemented without the requirement to reprogram the soothing seat 100 and that more powerful processing or artificial intelligence algorithms may be used where it would be inappropriate to integrate such a processor into a soothing seat 100 for example, where the power consumption or price is prohibitive.

Control of the position, bounce, swing, or sway of the convertible soothing seat described herein may be implemented by a computer program. The computer program may include computer executable code or instructions arranged to instruct a computer to control the convertible soothing seat described above. The computer program and/or the code or instructions for performing such methods may be provided to an apparatus, such as a computer, a smartphone, a tablet, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a non-transitory physical computer readable medium such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD. The computer program may be controllable by one or more user inputs including but not limited to keyboard, electromechanical switches, a mouse, a trackball, a touchscreen, gesture control or voice command via a microphone.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, a computer system, main memory, secondary memory, and removable storage units, as well as tangible articles of manufacture embodying any combination of the foregoing. Such control logic, when executed by one or more data processing devices (such as a computer system or processor(s)), may cause such data processing devices to operate as described herein.

Figure 7:
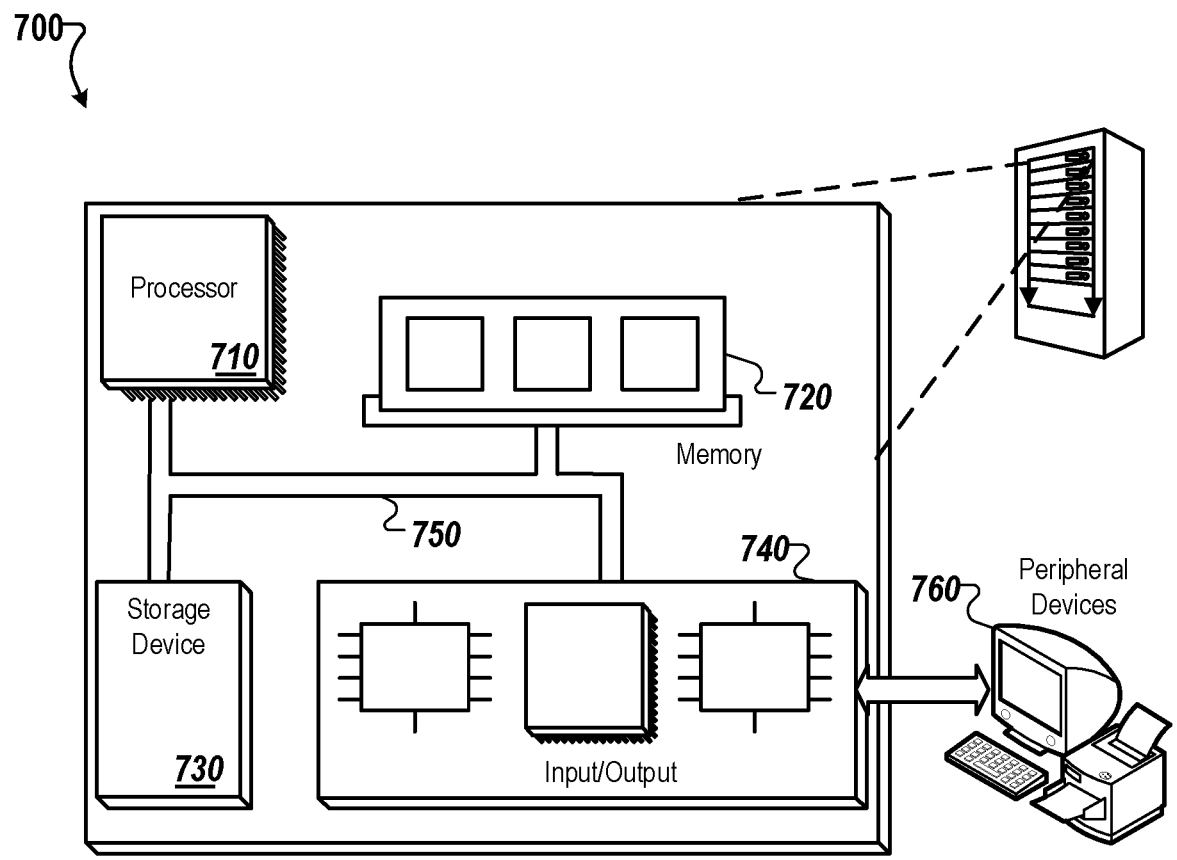
FIG. 7 shows a block diagram of an example computer system.

FIG. 7 shows a block diagram of an example computer system 700 that can be used to perform the methods and operations described herein. The system 700 includes a processor 710, a memory 720, a storage device 730, and an input/output device 740. Each of the components 710, 720, 730, and 740 can be interconnected, for example using a system bus 750. The processor 710 is capable of processing instructions for execution within the system 700. The processor 710 is capable of processing instructions stored in the memory 720 or on the storage device 730. The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 can include for example, a hard disk device, an optical disk device, a storage device that is shared over a network by multiple computing devices (e.g., a cloud storage device), or some other large capacity storage device. The input/output device 740 provides input/output operations for the system 700. In one implementation, the input/output device 740 can include one or more of network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g. keyboard, printer and display devices 760. Other implementations, however, can also be used, such as mobile computing devices, mobile communication devices, set-top box television client devices, etc. Although an example processing system has been described in FIG. 7, implementations of the subject matter and the operations described in this specification can be implemented in other types of digital electronic circuitry, or in computer software, firmware, or hardware, including the structures disclosed in this specification and their structural equivalents, or in combinations of one or more of them.

In the application, the words infant and baby have been used interchangeably where appropriate. The skilled person will appreciate that the words infant and baby both refer to a young human child and may be used in place of one another where this does not lead to confusion. Herein, where the term "concave" is used, the skilled person will appreciate that concave takes the opposite meaning to convex. The term "concave" is intended to refer to any inwardly curved or angled surface such that the interior of the surface includes re-entrant geometry. This may include curves and/or reflex angles. The term "condition" is intended to refer to the state of the seat which may include the presence or the absence of stimuli or sensed parameters, for example the presence or absence of a sound or other detectable stimulus.

What is claimed is:

1. A computer-implemented method of monitoring a condition of a soothing seat for an infant, comprising:
   receiving, at a processor, an input from an electronic sensor of the soothing seat,
      wherein the soothing seat comprises a support frame connecting to a base portion and rotatable relative to the base portion about a horizontal axis between a flat configuration and a bouncing configuration, and
      wherein the input is indicative of an orientation of the soothing seat about the horizontal axis;
   receiving, at the processor, one or more pre-determined parameters indicative of the orientation of the soothing seat being in an actionable state;
   determining based on the input from the electronic sensor and the one or more pre-determined parameters that the orientation of the soothing seat is in the actionable state;
   controlling an output to implement a remedial action;
   receiving, at the processor, a second input from a second electronic sensor;
   determining based on the second input whether the infant within the soothing seat is asleep; and
   upon determining that the infant is asleep, automatically controlling the support frame to the flat configuration.

2. The computer-implemented method of claim 1, wherein controlling the output to implement the remedial action comprises driving an electromechanical drive to apply oscillating motions to the soothing seat.

3. The computer-implemented method of claim 2, wherein the electromechanical drive comprises one or more of an electric motor, a drive screw, a pneumatic actuator, or a hydraulic actuator.

4. The computer-implemented method of claim 2, wherein driving the electromechanical drive to apply the oscillating motions to the soothing seat comprises applying one or more of a bouncing motion, a rocking motion, and a swinging motion.

5. The computer-implemented method of claim 1, further comprising:
   monitoring the input of the electronic sensor;
      determining based on the input from the electronic sensor and the one or more predetermined parameters that the orientation of the soothing seat is no longer in the actionable state; and
      controlling the output to stop implementing the remedial action.

6. The computer-implemented method of claim 5, wherein controlling the output to stop implementing the remedial action comprises gradually reducing an amplitude of oscillating motions applied to the soothing seat.

7. The computer-implemented method of claim 1, wherein the electronic sensor comprises a switch and/or a position sensor.

8. The computer-implemented method of claim 1, wherein the electronic sensor comprises a switch and/or a position sensor configured to determine a position of one or more components of the soothing seat comprising the support frame and the base portion.

9. The computer-implemented method of claim 8, wherein the one or more components comprises a seat rotatably mounted to the support frame.

10. The computer-implemented method of claim 1, wherein controlling the output to implement the remedial action comprises controlling a speaker to produce an audio signal.

11. The computer-implemented method of claim 10, wherein the audio signal comprises one or more of white noise, music, or pre-recorded sounds.

12. The computer-implemented method of claim 10, wherein the audio signal comprises a user-recorded audio recording.

13. The computer-implemented method of claim 12, further comprising:
   displaying on a user device a prompt for a user to record the user-recorded audio recording; and
   recording the user from a microphone.

14. The computer-implemented method of claim 1, wherein controlling the output to implement the remedial action comprises preventing a change of position of one or more components of the soothing seat comprising the support frame and the base portion.

15. The computer-implemented method of claim 14, wherein preventing the change of position comprises locking the one or more components of the soothing seat in position.

16. The computer-implemented method of claim 1, wherein the processor is a processor of a server or a user device physically separate from and in wired or wireless communication with the soothing seat.

17. The soothing seat, comprising:
   a seat;
   the support frame and the base portion of claim 1;
   a non-transitory computer readable medium; and
   one or more electronic sensors, and wherein the processor is configured to perform the method of claim 1.

18. A computer-implemented method of monitoring a condition of a soothing seat for an infant, comprising:
   receiving, at a processor, an input from a weight sensor of the soothing seat;
   receiving, at the processor, an upper threshold weight and a lower threshold weight each being indicative of the soothing seat being in an actionable state, the upper threshold weight indicating the soothing seat being in an overloaded state;

determining based on the input from the weight sensor, the upper threshold, and the lower threshold that the soothing seat is in the actionable state;

controlling an output to implement a remedial action;

receiving, at the processor, a second input from a second electronic sensor fixed to the soothing seat indicative of whether the soothing seat is positioned at an angle with respect to a level surface; and if the soothing seat is positioned at the angle with respect to the level surface, controlling the output to prevent the remedial action to be implemented.

19. The computer-implemented method of claim 18, wherein the actionable state is when the input is greater than the lower threshold weight and less than the upper threshold weight.

20. The computer-implemented method of claim 19, wherein controlling the output to implement the remedial action comprises driving an electromechanical drive to apply oscillating motions to the soothing seat.

21. The computer-implemented method of claim 20, further comprising:

monitoring the input of the weight sensor;

determining based on the input from the weight sensor, the lower threshold weight, and the upper threshold weight that the soothing seat is no longer in the actionable state; and controlling the output to stop implementing the remedial action.

22. The computer-implemented method of claim 18, wherein the actionable state is when the input is greater than the upper threshold weight, and controlling the output to implement the remedial action comprises preventing a change of position of one or more components of the soothing seat.

23. A computer-implemented method of monitoring a condition of a soothing seat for an infant, comprising:

receiving, at a processor, a first input from an electronic sensor of the soothing seat, the input indicative of a position of a harness of the soothing seat;

receiving, at the processor, a second input indicative of a position of the soothing seat;

controlling an output to implement an action based on the first input from the electronic sensor and the second input;

receiving, at the processor, a second input from a second electronic sensor;

determining based on the second input whether the infant within the soothing seat is asleep; and upon determining that the infant is asleep, controlling the output to prevent the remedial action to be implemented.

24. The computer-implemented method of claim 23, wherein when the soothing seat is in a flat configuration and the harness is in a covering position covering a first portion of the soothing seat, the action comprises providing an alert to a user.

25. The computer-implemented method of claim 24, wherein when the soothing seat is in a bouncing configuration and the harness is in a retracted position not covering a second portion of the soothing seat, the action comprises preventing an electromechanical drive to apply oscillating motions to the soothing seat.

* * * * *